United States Patent Office 3,629,251
Patented Dec. 21, 1971

3,629,251
DERIVATIVES OF 9-AMINOALKYL-1,2,8,9-TETRAAZAPHENALENES
John E. Francis, Pleasantville, N.Y., assignor to Geigy Chemical Corporation, Ardsley, N.Y.
No Drawing. Filed Aug. 12, 1968, Ser. No. 751,730
Int. Cl. C07d 51/06
U.S. Cl. 260—247.1
24 Claims

ABSTRACT OF THE DISCLOSURE 9-aminoalkyl-1,2,8,9-tetraazaphenalenes, optionally substituted in the 3-position by hydroxy or mercapto and in the 7-position by phenyl, are hypotensive agents.

DETAILED DESCRIPTION

The present invention pertains to a class of 1,2,8,9-tetraazaphenalenes which is graphically depicted by the following structural formula:

(I)
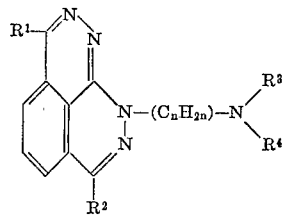

wherein $n$ has a value of from 2 to 4;
$R^1$ is hydrogen, hydroxy or mercapto;
$R^2$ is hydrogen or phenyl;
$R^3$ and $R^4$ taken independently are hydrogen or (lower)-alkyl, or taken together are the chain

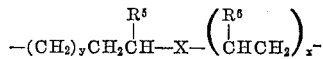

in which

X is oxygen, methylene, imino or (lower)alkylimino;
each of $R^5$ and $R^6$ is hydrogen or (lower)alkyl; and
each of $x$ and $y$ has a value of 0 or 1, at least one of $x$ and $y$ having a value of 1.

Also included within the scope of the present invention are the acid addition salts of these 9-aminoalkyl-1,2,8,9-tetraazaphenalene derivatives, obtained via the conventional methods. Typical salts thus include those derived from hydrochloric, hydrobromic, sulfuric, phosphoric, methanesulfonic, acetic, lactic, succinic, embonic, malic, maleic, aconitic, phthalic, tartaric and the like acids. quaternary salts derived from alkyl halides are also within the scope of this invention.

The term "(lower)alkyl" denotes a branched or straight hydrocarbon chain containing up to and including 6 carbon atoms. Illustrative of such groups are methyl, ethyl, propyl, isopropyl, n-butyl, sec-butyl, t-butyl, pentyl, hexyl and the like.

The substitutents $R^3$ and $R^4$, in addition to being hydrogen or a (lower)alkyl group, can also form, together with the nitrogen atom to which they are directly attached, a saturated heterocyclic ring of from five to seven ring members. Those of five members are embraced by the above formula when $y$ has a value of 1 and $x$ has a value of 0 and include pyrrolidino, isoxazolidino and pyrazolidino. Six membered rings are those wherein $y$ has a value of 0 and $x$ has a value of 1 and include piperidino, piperazino and morpholino. Seven membered rings are those wherein both $x$ and $y$ have a value of 1 and include hexamethyleneimino, homopiperazino and homomorpholino. The above ring systems may be optionally substituted by up to two (lower)alkyl groups, preferably methyl, thus embracing groups such as 4-ethylpiperazino, 2,6-dimethylmorpholino, 3-methylpyrazolidino and the like.

The compounds of the present invention have demonstrated the property of lowering blood pressure in warm blooded animals when administered orally or parenterally and are thus useful as hypotensive agents. The hypotensive properties of this class of compounds can be conveniently observed in the laboratory model in such recognized tests as the angiotensin-induced hypertensive dog, the renal hypertensive (Goldblatt) dog or the intact anaesthetized cat.

The following description of using and making the invention represents the best modes presently contemplated for carrying out the invention. For use as hypotensive agents, the compounds of the present invention are incorporated in compositions suitable for oral administration to animals in solid and liquid unit dosage forms, such as tablets, capsules, powders, granules, syrups, elixirs, and the like. The term unit dosage form as used in this specification and claims refers to physically discrete units suitable as unitary dosages for animals, each unit containing a predetermined quantity of active material calculated to produce the desired therapeutic effect in association with the required pharmaceutical diluent, carrier or vehicle.

Powders are prepared by comminuting a compound of this invention to a suitably fine size and mixing with a similarly comminuted diluent. The diluent can be an edible carbohydrate material such as starch. A sweetening agent or sugar may also be present as well as flavoring oil.

Granules for reconstitution into a liquid oral preparation are prepared utilizing water-soluble diluents. A powder mixture of the finely divided compound and a water-soluble diluent such as sucrose, glucose, and the like, is wetted with a binder such as acacia mucilage, gelatin solution, methylcellulose solution and forced through a screen to form granules which are allowed to dry. A suspending agent such as tragacanth may be included in the composition.

Capsules are made by preparing a powder mixture as described above and filling formed gelatin sheaths. As an adjuvant to the filling operation, a lubricant such as talc, magnesium stearate and calcium stearate may be added to the powder mixture before the filling operation.

Tablets are made by preparing a powder mixture, granulating or slugging, adding a lubricant and pressing into tablets. The powder mixture is prepared by mixing the compound, suitably comminuted, with a diluent or base such as starch, sucrose, kaolin, dicalcium phosphate and the like. The powder mixture can be granulated by wetting with a binder such as syrup, starch paste or acacia mucilage and forcing through a screen. As an alternative to granulating, the powder mixture can be slugged, i.e., run through the tablet machine and the resulting imperfectly formed tablets broken into pieces (slugs). The slugs can be lubricated to prevent sticking to the tablet forming dies by means of the addition of stearic acid, a stearate salt, talc or mineral oil. The lubricating mixture is then compressed into tablets. A protective coating consisting of a sealing coat of shellac, a coating of sugar and methylcellulose, and a polish coating of carnauba wax may be provided.

Oral fluids are prepared in unit dosage forms such as syrups and elixirs wherein each teaspoonful of composition contains a predetermined amount of the compound for administration.

A syrup is prepared by suspending the compound in a suitably flavored aqueous sucrose solution. Similarly, an elixir is prepared utilizing a nontoxic alcohol vehicle.

For parenteral administration, aqueous and oleaginous fluid unit dosage forms can be prepared. In preparing the parenteral form, a measured amount of the compound is placed in a vial, the vial and its contents sterilized and sealed. An accompanying vial of sterile water may be provided as a vehicle to form a suspension prior to administration.

The amount of these compounds which is administered in use to effect a hypotensive response must in all cases be adjusted to the animal being treated, its age, weight, and condition as well as the degree of response required. Thus while a hypotensive response is observed for these compounds in the range of about .03 mg./kg. to about 30 mg./kg., the actual dose should be carefully titrated to the particular hypertensive subject in accordance with well recognized principes of pharmacology.

The preparation of these compounds can be achieved in a number of fashions.

In a first embodiment, a 9-unsubstituted 1,2,8,9-tetraazaphenalene of Formula II is treated with an aminoalkyl chloride or bromide of Formula III:

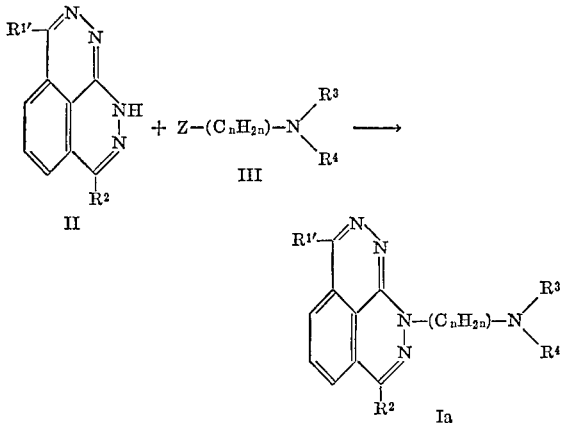

In the above transformation, Z is chloro or bromo, $R^{1'}$ is hydrogen or hydroxy, and $R^2$, $R^3$ and $R^4$ are as previously defined. The reaction is executed in the presence of a base such as sodium or potassium hydroxide, sodium methoxide, sodium carbonate or the like, optionally in a suitable organic solvent such as methanol, ethanol, dimethylsulfoxide, dimethylformamide or the like. External heating of up to about 100° C. can be applied. The product is isolated by conventional techniques such as concentration and solvent extraction and is purified through chromatography or recrystallization.

A modification of the foregoing procedure leading to those compounds of Formula I wherein $R^1$ is hydroxy involves amination of a substituted 1(2H)-phthalazinone of Formula IV with an amine of Formula III above, followed by treatment of the resulting 2-aminoalkyl-1(2H)-phthalazinone with hydrazine:

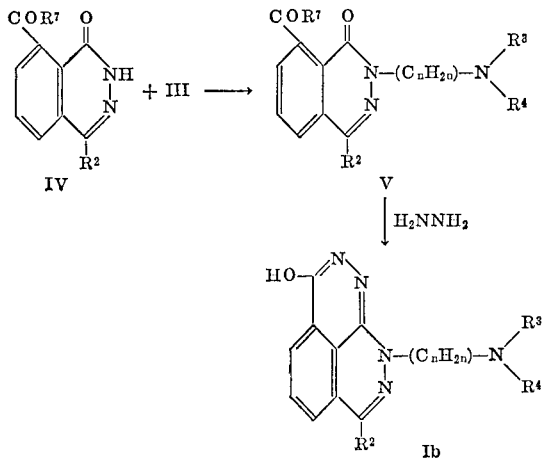

In the above transformation, $R^7$ is hydroxy or alkoxy, and $R^2$, $R^4$ and $n$ are as previously defined.

In a second embodiment of the present invention, a 3-hydroxy 9-(chloroalkyl)- or 9 - (bromoalkyl - 1,2,8,9-tetraazaphenalene of Formula VI is treated with ammonia, or a primary or secondary amine of Formula VII to yield the compounds of Formula Ib.

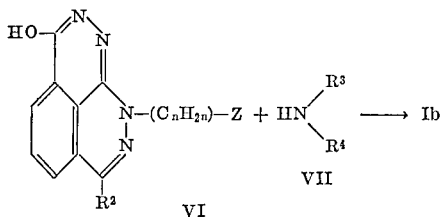

In the above transformation, $R^2$, $R^3$, $R^4$, $n$ and Z are as previously defined.

The compounds of Formula I wherein $R^1$ is mercapto are readily obtained from the corresponding compounds wherein $R^1$ is hydroxy through treatment with phosphorus pentasulfide in refluxing pyridine.

The tetraazaphenalene starting materials disclosed herein are the subject of copending applications. Briefly their preparation involves treatment of a compound of the formula:

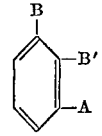

wherein A is an aldehyde or dibromomethyl group when $R^2$ is hydrogen or a benzoyl group when $R^2$ is phenyl and each of B and B' is a carboxy group or a group the oxidative state of which corresponds to that af a carbonyl group, such as an acid halide, anhydride, ester or lactone, with a single molar equivalent of hydrazine to yield a 1(2H)-phthalazinone of Formula IV when $R^7$ is hydroxy. This may then be converted to the corresponding acid chloride or acid bromide or, preferably, esterified to yield a compound of Formula IV wherein $R^7$ is alkoxy. This intermediate is treated with a second molar equivalent of hydrazine to yield the tetraazaphenalene of Formula II wherein $R^{1'}$ is hydroxy. The corresponding starting material wherein $R^{1'}$ is hydrogen is obtained through an analogous treatment of a 2-carbonyl-6-aldehydobenzoic acid (which is equivalent to a 3-hydroxy-7-aldehydophthalide) with two moles of hydrazine. Alternatively the compounds of Formula II wherein $R^{1'}$ is hydrogen are obtained through a two step process of treatment of the corresponding hydroxy compound with phosphorus pentasulfide in refluxing pyridine to yield the 3-mercapto-1,2,8,9-tetraazaphenalene which is then treated with Raney nickel.

The 1(2H)-phthalazinone of Formula IV is treated with a hydroxy alkyl chloride to yield a 2-(hydroxyalkyl)-1(2H)-phthalazinone and this upon treatment with hydrazine in a manner analogous to that already described in turn yields a 9-(hydroxyalkyl)-1,2,8,9-tetraazaphenalene. The latter compound is halogenated, as with thionyl chloride, to yield the 9-haloalkyl-1,2,8,9-tetraazaphenalene of Formula VI.

The following examples will serve to further typify the nature of the present invention without being a limitation on the scope thereof.

PREPARATION I 3-hydroxy-7-phenyl-1,2,8,9-tetraazaphenalene (a) 8 - carboxy - 4 - phenyl-1(2H)-phthalazinone.—A mixture of 32.5 g. of 3-benzoylphthalic acid and 85 ml. of hydrazine hydrate in 145 ml. of water is heated at reflux for 18 hours. Upon cooling and acidification with hydrochloric acid, the product forms as a solid. This is collected and recrystallized from glacial acetic acid, M.P. 257–259°.

(b) 8-carbomethoxy-4-phenyl-1(2H)-phthalazinone.—The product of part (a) (19.0 g.), 32 ml. of thionyl chloride and 115 ml. of chlorobenzene are heated at reflux with stirring and exclusion of moisture for 3 hours. The solid obtained upon concentration under reduced pressure is taken up in 300 ml. of methanol and this solution is then heated at reflux for 18 hours. Upon cooling the product, M.P. 198–202°, is collected and can be used directly in the next step.

(c) 3-hydroxy-7-phenyl-1,2,8,9-tetraazaphenalene.—A mixture of 18.6 g. of 8-carbomethoxy-4-phenyl-1(2H)-phthalazinone, 400 ml. of hydrazine hydrate and 100 ml. of water is heated at reflux for 20 hours. The solid which forms upon cooling is collected, washed with water and recrystallized from methyl Cellosolve, M.P. over 350° C.

PREPARATION II 3-hydroxy-1,2,8,9-tetraazaphenalene (a) 3-dibromomethylphathalic anhydride.—A mixture of 3-methylphthalic anhydride (81 g.), N-bromosuccinimide (182 g.), benzoyl peroxide (40 mg.) and carbon tetrachloride (1500 ml.) is irradiated and heated to reflux by a 100 watt insertion-type ultraviolet lamp under stirring and exclusion of moisture. After the mixture becomes brick red, an additional 40 mg. of benzoyl peroxide is added. Illumination at reflux is carried out during 24 hours. The mixture is cooled and filtered free of succinimide and the filtrate is evaporated in vacuo. The residual yellowish brown solid is dissolved in hot ether, treated with decolorizing charcoal and filtered. Addition of hexane to the filtrate affords the crystalline product, M.P. 90.5–93° C. in 72% yield. Two recrystallizations from etherhexane yield colorless needles melting at 93–95° C.

Calc. for $C_9H_4Br_2O_3$ (percent): C, 33.78; H, 1.26; Br, 49.92. Found (percent): C, 33.66; H, 1.20; Br, 49.41.

(b) 3-hydroxy-7-carboxyphthalide.—3-dibromomethylphthalic anhydride (40 g.) is added in small portions to a hot solution of 2 N sodium hydroxide (500 ml.) with stirring. After ten minutes, the clear solution is rendered strongly acidic with concentrated hydrochloric acid and heated for one-half hour at 80°. The solution is evaporated to dryness in vacuo and the residue is dissolved in hot water (600 ml.), treated with decolorizing charcoal and filtered. After three days at 5° C., the colorless filtrate yields 21.3 g. (88%) of colorless blocks, M.P. 163.5–166° C.

(c) 8-carboxy-1(2H)-phthalazinone.—A mixture of 30.2 g. of 3-hydroxy-7-carboxyphthalide, 50 ml. of 100% hydrazine hydrate and 100 ml. of water is heated at reflux for 16 hours. The mixture is rendered acidic with dilute hydrochloric acid and the solid which forms is collected by filtration, washed with water, dried and recrystallized from glacial acetic acid to yield the intermediate product, M.P. 303.5–306° C.

(d) 3 - hydroxy-1,2,8,9-tetraazaphenalene.—Treatment of the product of part (c) with hydrazine according to the procedure of part (c) of Preparation I yields 3-hydroxy-1,2,8,9-tetraazaphenalene, M.P. above 350° C.

PREPARATION III 1,2,8,9-tetraazaphenalene

Upon refluxing a mixture of 44.14 g. of 3-hydroxy-1,2,8,9-tetraazaphenalene, 58.2 g. of phosphorus pentasulfide and 356 ml. of pyridine for 2.5 hours, there is formed 3-mercapto-1,2,8,9-tetraazaphenalene which is isolated by collecting the solid which forms upon quenching the reaction mixture in ice-water, drying the same in vacuo at 100° C. and recrystallizing it from dimethylformamide-water.

This product is dissolved in methyl Cellosolve and ethanol and reduced with Raney nickel to yield 1,2,8,9-tetraazaphenalene, M.P. 294–298° C.

7-phenyl-1,2,8,9-tetraazaphenalene, M.P. 292–293° C. is obtained in an analogous fashion.

Alternatively 3-hydroxy-7-aldehydophthalide and 3-hydroxy-7-benzoylphthalide can be treated with hydrazine to respectively yield 1,2,8,9-tetraazaphenalene and 7-phenyl-1,2,8,9-tetraazaphenalene.

EXAMPLE 1

3-hydroxy-9-[2-(N,N-dimethylamino)ethyl]-1,2,8,9-tetraazaphenalene

A solution of 14.4 g. of 2-(N,N-dimethylamino)ethyl chloride hydrochloride in 100 ml. of dry methanol is neutralized under cooling with 100 ml. of 1 N sodium hydroxide and promptly added to a solution of 20.4 g. of 8-carbomethoxy-1(2H)-phthalazinone in 250 ml. of methanol. This mixture is treated with 1 N sodium hydroxide and heated at reflux for 60 minutes. The solution is evaporated at reduced pressure to a semi-solid mass, dissolved in 1 N hydrochloric acid and extracted with chloroform. The acidic layer is cooled and filtered and the filtrate rendered basic with 20% aqueous sodium carbonate and extracted with chloroform. The chloroform extracts are dried over anhydrous sodium sulfate and concentrated at reduced pressure. The residual ester, 2-[2-(N,N-dimethylamino)ethyl]-8-carbomethoxy-1(2H)-phthalazinone, is heated at reflux for 40 hours with a mixture of 420 ml. of 100% hydrazine hydrate and 140 ml. of water wtih stirring. The mixture is cooled and the yellow solid collected, washed with water and air dried. The crude material is recrystalized twice from benzene to afford the pure product melting in the range 197 to 199° C.

Calc. for $C_{13}H_{15}N_5O$ (percent): C, 60.68; H, 5.85; N, 27.22. Found (percent): C, 60.65; H, 5.64; N, 27.03.

In a similar fashion the hydrochloride salts of the following alkyl chlorides are substituted for 2-(N,N-dimethylamino)ethyl chloride hydrochloride:

(a) 2-(N,N-diethylamino)ethyl chloride
(b) 3-(N,N-dimethylamino)propyl chloride
(c) 2-hexamethyleneiminoethyl chloride
(d) 1-methyl-4-(2-chloropropyl)piperazine
(e) 3-morpholinopropyl chloride
(f) 2-(2,6-dimethylmorpholino)ethyl chloride There are thus respectively obtained the following compounds:

(a) 3-hydroxy-9-[2-(N,N-diethylamino)ethyl]-1,2,8,9-tetraazaphenalene, M.P. 130–133° C.

(b) 3-hydroxy-9-[3-(N,N-dimethylamino)propyl]-1,2,8,9-tetraazaphenalene, M.P. 150–153° C.

(c) 3-hydroxy-9-(2-hexamethyleneiminoethyl)-1,2,8,9-tetraazaphenalene, M.P. 183.5–186.5° C.

(d) 3-hydroxy-9-[1-methyl-2-(4-methylpiperazino)ethyl]-1,2,8,9-tetraazaphenalene, M.P. 161–166° C.

(e) 3 - hydroxy-9-(3-morpholinopropyl)-1,2,8,9-tetraazaphenalene, M.P. 180–183° C.

(f) 3 - hydroxy-9-[2-(2,6-dimethylmorpholino)ethyl]-1,2,8,9-tetraazaphenalene, M.P. 203–205° C.

EXAMPLE 2

9-(2-hexamethyleneiminoethyl)-1,2,8,9-tetraazaphenalene

A solution of 9.9 g. of N-(2-chloroethyl)hexamethyleneimine hydrochloride in 100 ml. of methanol is treated with 50 ml. of 1 N sodium hydroxide. This mixture is added to a suspension of 8.5 g. of 1,2,8,9-tetraazaphenalene in 200 ml. of methanol and an additional 50 ml. of 1 N sodium hydroxide are added. The mixture is heated at reflux for three hours, then evaporated to dryness at reduced pressure and finally chromatographed on neutral alumina with a mixture of 5:1 benzene:dimethylformamide as the eluent. Concentration of the second 100 ml. fraction yields a yellow crystalline solid which is further purified through recrystallization from benzene-hexane. The pure product melts in the range of 117 to 121°.

Calc. for $C_{17}H_{21}N_5$ (percent): C, 69.12; H, 7.17; N, 23.71. Found (percent): C, 68.99; H, 7.07; N, 23.52.

In a similar fashion, but utilizing 1-methyl-4-(2-chloroethyl)piperazine, there is obtained 9-[2-4-methylpiperazino)ethyl]-1,2,8,9-tetraazaphenalene, M.P. 112–117°.

EXAMPLE 3

3-hydroxy-9-(2-pyrrolidinoethyl)-1,2,8,9-tetraazaphenalene

A mixture of 28 g. of 3-hydroxy-1,2,8,9-tetraazaphenalene, 200 ml. of dimethylsulfoxide, 8.1 g. of sodium methoxide and 22 g. of 2-pyrrolidinoethyl chloride is stirred at 80° with exclusion of moisture for five hours and then poured into ice-water. The precipitate is collected, washed with water and suspended in dilute hydrochloric acid. The suspension is filtered and the filtrate rendered basic with sodium carbonate solution. The solid which forms is collected, washed with water, dried and recrystallized from isopropanol to afford the product, M.P. 188 to 191° C.

In a similar fashion, the following alkyl chlorides are employed in place of 2-pyrrolidinoethyl chloride:

(a) 2-morpholinoethyl chloride
(b) 2-piperidinoethyl chloride

There are thus respectively obtained:
(a) 3-hydroxy-9-(2-morpholinoethyl) - 1,2,8,9 - tetraazaphenalene, M.P. 203–205.5° C.
(b) 3-hydroxy-9-(2 - piperidinoethyl)-1,2,8,9-tetraazaphenalene, M.P. 178–180° C.

EXAMPLE 4

3-hydroxy-7-phenyl-9-(2-morpholinoethyl)-1,2,8,9-tetraazaphenalene

A mixture of 15.9 g. of 3-hydroxy-7-phenyl-1,2,8,9-tetraazaphenalene, 100 ml. of dimethylsulfoxide, 3.6 g. of sodium methoxide and 9 g. of 2-morpholinoethyl chloride is stirred at 80° C. for 5 hours with exclusion of moisture. The mixture is then cooled, poured into ice-water and filtered. The solid is then washed with water, dried and recrystallized from ethanol to yield the product, M.P. 192–193° C.

EXAMPLE 5

9-(2-morpholinoethyl)-1,2,8,9-tetraazaphenalene

A mixture of 5.1 g. of 1,2,8,9-tetraazaphenalene, 1.7 g. of sodium methoxide and 75 ml. of dimethylsulfoxide is heated with 5 g. of 2-morpholinoethyl chloride at 80° for four hours under exclusion of moisture. The mixture is then poured into ice-water and the aqueous solution extracted with chloroform. The chloroform layer is in turn extracted with dilute hydrochloric acid and the acidic extracts are rendered basic with sodium carbonate and reextracted with chloroform. These chloroform extracts are concentrated at reduced pressure and the residual solid dissolved in a 1:5 benzene:dimethylformamide mixture and filtered through a column of 200 g. of activated aluminum oxide. Elution with 150 ml. of the solvent mixture and removal of the solvent at reduced pressure yields the product which can be further purified through recrystallization from isopropanol, M.P. 138–140° C.

EXAMPLE 6

3-mercapto-9-(2-morpholinoethyl)-1,2,8,9-tetraazaphenalene

A mixture of 29.9 g. of 3-hydroxy-9-(2-morpholinoethyl)-1,2,8,9-tetraazaphenalene, 25 g. of phosphorus pentasulfide and 250 ml. of pyridine is stirred at reflux for 5 hours and then poured into ice-water. The solid is collected, washed with water, dried and recrystallized from benzene to yield the product, M.P. 220–220° C.

EXAMPLE 7

3-hydroxy-9-(2-morpholinoethyl)-1,2,8,9-tetraazaphenalene (a) 2 - (2-hydroxyethyl) - 8 - carbomethoxy - 1(2H)-phthalazinone.—To a suspension of 40.8 g. of 8-carbomethoxy-1(2H)-phthalazinone in 400 ml. of methanol are added 20 g. of 2-chloroethanol in 100 ml. of methanol followed by 200 ml. of 1 N sodium hydroxide. The mixture is stirred at reflux for three hours and then concentrated at reduced pressure, the residue being next triturated with water. The white solid which forms is starting material and is removed by filtration. The aqueous filtrate is concentrated at reduced pressure to remove water, triturated with acetone and filtered. The filtrate is evaporated to dryness and the residue triturated in hexane. The resulting white crystalline solid is recrystallized from benzene-hexane to afford 2-(2-hydroxyethyl)-8-carbomethoxy-1(2H)-phthalazinone, M.P. 101–105° C.

(b) 3-hydroxy - 9 - (2-hydroxyethyl)-1,2,8,9-tetraazaphenalene.—A mixture of 28 g. of 2-(2-hydroxyethyl)-8-carbomethoxy-1(2H)-phthalazinone, 120 ml. of water, and 420 ml. of 100% hydrazine hydrate is heated at reflux for 96 hours and filtered hot. The filtrate is cooled and the precipitate which forms is collected, washed with water and recrystallized from methyl Cellosolve to yield the intermediate product, M.P. 248–250° C. (dec.).

(c) 3-hydroxy - 9 - (2-chloroethyl) - 1,2,8,9 - tetraazaphenalene.—A mixture of 2.3 g. of 3-hydroxy-9-(2-hydroxyethyl)-1,2,8,9-tetraazaphenalene, 2 ml. of thionyl chloride and 50 ml. of benzene is heated at 60° with exclusion of moisture for one hour, then at 80° for ½ hour. The mixture is cooled well and the solid is collected, washed with benzene and dried to yield the intermediate product, M.P. 278–283° C.

(d) 3-hydroxy - 9 - (2-morpholinoethyl)-1,2,8,9-tetraazaphenalene.—A solution of 2.6 g. of 3-hydroxy-9-(2-chloroethyl)-1,2,8,9-tetraazaphenalene in 50 ml. of methyl Cellosolve is combined with 10 ml. of morpholine. Immediate fuming takes place and the color changes from brown to yellow. The mixture is heated at 100° C. for 20 hours, cooled and filtered. The filtrate is evaporated to dryness and the residue triturated with water and filtered. The yellow solid thus collected is dissolved as well as possible in 1 N hydrochloric acid, filtered and the resulting filtrate rendered basic with 20% sodium carbonate. The mixture is extracted with chloroform and the chloroform layer dried and concentrated at reduced pressure to yield the product identical to that of Example 3(a).

EXAMPLE 8

3-hydroxy-9-(2-n-hexylaminoethyl)-1,2,8,9-tetraazaphenalene

A solution of 2.6 g. of 3-hydroxy-9-(2-chloroethyl)-1,2,8,9-tetraazaphenalene in 50 ml. of methyl Cellosolve is combined with 10 ml. of n-hexylamine. Immediate fuming takes place. The mixture is heated at 100–105° C. for 20 hours, cooled and filtered. The filtrate is evaporated to dryness, the residue triturated with cold water, and filtered. The yellow solid thus collected is dissolved as well as possible in 1 N hydrochloric acid, filtered and the resulting filtrate rendered basic with 20% sodium carbonate solution. The mixture is extracted with chloroform and the chloroform layer dried and concentrated at reduced pressure to yield 3-hydroxy-9-(2-n-hexylaminoethyl)-1,2,8,9-tetraazaphenalene.

EXAMPLE 9

3-hydroxy-9-(2-morpholinoethyl)-1,2,8,9-tetraazaphenalene methanesulfonate

Six grams of the free base of the title compound is dissolved in a solution of 3 ml. of methanesulfonic acid in 150 ml. of methanol. The mixture is partially evaporated under reduced pressure and treated with ether. The product which forms is collected, washed with ether, and recrystallized from methanol to give the title methanesulfonate, M.P. 230–234° C.

Likewise by dissolving the free base in an excess of 1 N hydrochloric acid and evaporating the solution to dryness, there is obtained the corresponding hydrochloride which after recrystallization from methanol demonstrates a melting point of 288–291° C.

EXAMPLE 10

Ingredient: Quantity/capsule (mg.)
3 - hydroxy - 9 - (2 - morpholinoethyl)-1,2,8,9-tetraazaphenalene _____ 10
Corn starch, U.S.P. _____ 200

The foregoing ingredients are mixed and introduced into a two-piece No. 1 hard gelatin capsule.

EXAMPLE 11

Ingredient: Quantity/capsule (mg.)
3 -hydroxy - 9 - [2 - (2,6-dimethylmorpholino)-ethyl] - 1,2,8,9 - tetraazaphenalene _____ 50
Corn starch U.S.P. _____ 130
Lactose _____ 160
Cab-O-Sil M-5 _____ 4
Gelatin U.S.P. _____ 5
Magnesium stearate U.S.P. _____ 1

The foregoing ingredients are thoroughly mixed and pressed into tablets suitable for oral administration of 50 mg. of active ingredient. The tablets may be scored to permit administration of fractional doses.

EXAMPLE 12

Ingredient: Quantity/capsule (mg.)
3 - hydroxy - 7 - phenyl-9-(2-morpholinoethyl)-1,2,8,9 - tetraazaphenalene _____ 250
Lactose _____ 80
Corn starch _____ 70
Soluble starch _____ 15
Magnesium stearate _____ 5

The first three ingredients are thoroughly mixed and granulated with a solution of the soluble starch. This granulate is dried, mixed with the magnesium stearate and pressed into tablet cores which are coated as with sugar.

What is claimed is:

1. A compound of the formula:

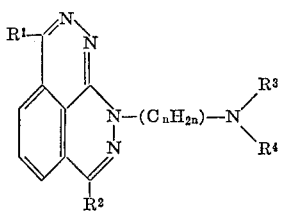

wherein $n$ has a value of from 2 to 4;
$R^1$ is hydrogen, hydroxy or mercapto;
$R^2$ is hydrogen or phenyl; and
$R^3$ and $R^4$ when taken independently are hydrogen or (lower)-alkyl or when taken collectively are the chain

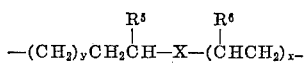

in which

X is oxygen, methylene, imino, or (lower)-alkylimino; each of $R^5$ and $R^6$ is hydrogen or (lower)-alkyl; and each of $x$ any $y$ has a value of 0 or 1, at least one of $x$ and $y$ having a value of 1.

2. The nontoxic pharmaceutically acceptable acid addition salts of a compound according to claim 1.

3. A compound according to claim 1 wherein $R^1$ is hydrogen or hydroxy and $R^3$ and $R^4$ are hydrogen or (lower)alkyl.

4. A compound according to claim 1 wherein $R^1$ is hydrogen or hydroxy, and X is methylene.

5. A compound according to claim 1 wherein $R^1$ is hydrogen or hydroxy, X is oxygen, each of $R^5$ and $R^6$ is hydrogen or methyl, $x$ has a value of 1 and $y$ has a value of 0.

6. The compound according to claim 1 wherein $R^1$ is hydroxy, $R^2$ is hydrogen, $R^3$ and $R^4$ are each methyl and the group —$(C_nH_{2n})$— is ethylene.

7. The compound according to claim 1 wherein $R^1$ is hydroxy, $R^2$ is hydrogen, each of $R^3$ and $R^4$ is ethyl and the group —$(C_nH_{2n})$— is ethylene.

8. The compound according to claim 1 wherein $R^1$ is hydroxy, $R^2$ is hydrogen, each of $R^3$ and $R^4$ is methyl and the group —$(C_nH_{2n})$— is trimethylene.

9. The compound according to claim 1 wherein $R^1$ is hydroxy, $R^2$ is hydrogen, $R^2$ and $R^3$ together are tetramethylene and the group—$(C_nH_{2n})$— is ethylene.

10. The compound according to claim 1 wherein $R^1$ is hydroxy, $R^2$ is hydrogen, $R^2$ and $R^3$ together are pentamethylene, and the group —$(C_nH_{2n})$— is ethylene.

11. The compound according to claim 1 wherein $R^1$ is hydroxy, $R^2$ is hydrogen, $R^3$ and $R^4$ together are hexamethylene and the group —$(C_nH_{2n})$— is ethylene.

12. The compound according to claim 1 wherein $R^1$ and $R^2$ are each hydrogen, $R^3$ and $R^4$ together are hexamethylene and the group —$(C_nH_{2n})$— is ethylene.

13. The compound according to claim 1 wherein $R^1$ and $R^2$ are each hydrogen, $R^3$ and $R^4$ together are the group —$CH_2CH_2$—$N(CH_3)CH_2CH_2$— and the group —$(C_nH_{2n})$— is ethylene.

14. The compound according to claim 1 wherein $R^1$ is hydroxy, $R^2$ is hydrogen, $R^3$ and $R^4$ together are the group —$CH_2CH_2$—$N(CH_3)CH_2CH_2$— and the group $$—(C_nH_{2n})—$$

is 1,2-propylene.

15. The compound according to claim 1 wherein $R^1$ is hydroxy, $R^2$ is hydrogen, $R^3$ and $R^4$ together are the group —$CH_2CH_2OCH_2CH_2$— and the group —$(C_nH_{2n})$— is ethylene.

16. The compound according to claim 1 wherein $R^1$ is mercapto, $R^2$ is hydrogen, $R^3$ and $R^4$ together are the group —$CH_2CH_2OCH_2CH_2$— and the group $$—(C_nH_{2n})—$$

is ethylene.

17. The compound according to claim 1 wherein $R^1$ is hydroxy, $R^2$ is phenyl, $R^3$ and $R^4$ together are the group —$CH_2CH_2OCH_2CH_2$— and the group —$(C_nH_{2n})$— is ethylene.

18. The compound according to claim 1 wherein $R^1$ and $R^2$ are each hydrogen, $R^3$ and $R^4$ together are the group —$CH_2CH_2OCH_2CH_2$— and the group $$—(C_nH_{2n})—$$

is ethylene.

19. The compound according to claim 1 wherein $R^1$ is hydroxy, $R^2$ is hydrogen, $R^3$ and $R^4$ are the group $$—CH_2CH_2OCH_2CH_2—$$

and the group —$(C_nH_{2n})$— is trimethylene.

20. The compound according to claim 1 wherein $R^1$ is hydroxy, $R^2$ is hydrogen, $R^3$ and $R^4$ together are the group —$CH_2CH(CH_3)OCH(CH_3)CH_2$— and the group $$—(C_nH_{2n})—$$

is ethylene.

21. A compound of the formula:

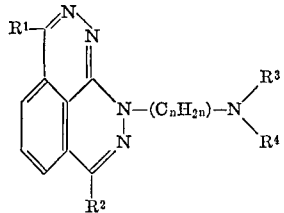

wherein
*n* has a value of from 2 to 4;
$R^1$ is hydrogen, hydroxy or mercapto;
$R^2$ is hydrogen or phenyl; and
each of $R^3$ and $R^4$ is hydrogen or (lower)alkyl.

22. A compound of the formula:

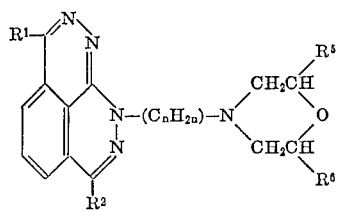

wherein
*n* has a value of from 2 to 4;
$R^1$ is hydrogen, hydroxy or mercapto;
$R^2$ is hydrogen or phenyl; and
each of $R^3$ and $R^4$ is hydrogen or (lower)alkyl.

23. A compound of the formula:

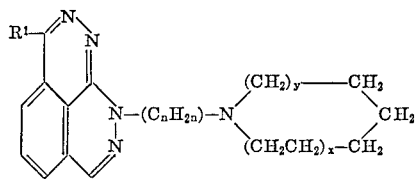

wherein
*n* has a value of from 2 to 4;
$R^1$ is hydrogen, hydroxy or mercapto;
$R^2$ is hydrogen or phenyl; and
each of *x* and *y* has a value of 0 or 1, at least one of *x* and *y* having a value of 1.

24. A compound of the formula:

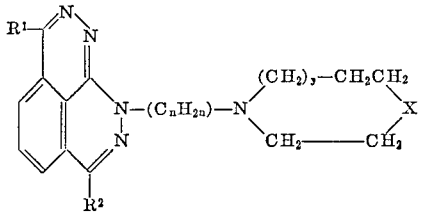

wherein
*n* has a value of from 2 to 4;
$R^1$ is hydrogen, hydroxy or mercapto;
$R^2$ is hydrogen or phenyl;
X is imino or (lower)alkylimino; and
*y* has a value of 0 or 1.

References Cited
UNITED STATES PATENTS

| | | | |
|---|---|---|---|
| 3,429,988 | 2/1969 | Doebel et al. | 260—250 A |
| 3,429,882 | 2/1969 | Doebel et al. | 260—250 A |

NICHOLAS S. RIZZO, Primary Examiner

U.S. Cl. X.R.

260—247.5, 250; 424—250